United States Patent [19]

Traylor et al.

[11] Patent Number: 5,286,887
[45] Date of Patent: Feb. 15, 1994

[54] POLYMERS OF MACROCYCLIC METAL CHELATORS AND METHODS FOR THE PREPARATION AND USE THEREOF

[75] Inventors: Teddy G. Traylor, La Jolla; Young S. Byun, San Diego, both of Calif.

[73] Assignee: Regents of the University of California, Oakland, Calif.

[21] Appl. No.: 764,593

[22] Filed: Sep. 24, 1991

[51] Int. Cl.$^5$ .................. C07F 15/02; C08G 65/22; C08G 59/00; C08G 73/06
[52] U.S. Cl. .......................... 556/1; 556/32; 556/138; 528/402; 528/403; 528/406; 528/423
[58] Field of Search ............ 556/138, 1, 32, 170; 540/145; 528/402, 406, 423, 409, 412, 416

[56] References Cited

U.S. PATENT DOCUMENTS

| | | | |
|---|---|---|---|
| 3,481,945 | 12/1969 | Nichols et al. | 260/299 |
| 4,171,958 | 10/1979 | Willcox | 44/63 |
| 4,315,998 | 2/1982 | Neckers et al. | 525/332 |
| 4,436,663 | 3/1984 | Maruhashi et al. | 260/245.91 |
| 4,497,737 | 2/1985 | Sargeson et al. | 556/138 |
| 4,565,845 | 1/1986 | Inoue et al. | 525/25 |
| 4,568,435 | 2/1986 | Shelnutt | 204/157.52 |
| 4,665,134 | 5/1987 | Inoue et al. | 525/419 |
| 4,724,062 | 2/1988 | Naarmann et al. | 204/58.5 |
| 4,774,356 | 9/1988 | Inoue et al. | 560/224 |

(List continued on next page.)

OTHER PUBLICATIONS

Kellman et al., Fluoronated Polyarylether-Sulfones via Phase Transfer Catalyzed Nucleophilic Aromatic Substitution, Polymer Preprints, 164–165, (1980).

Kellman et al., Phase Transfer Catalyzed Polymerizations II. Fluoronated Polyarylsulfides and Oxides, Polymer Preprints, 383–834, (1981).

Gerbi et al., Phase Transfer Catalyzed Polymerizations III. Effect of Water on Formation of Polyarylethers and Ether–Sulfones, Polymer Preprints, 385–386, (1981).

Gerbi et al., Phase Transfer Catalyzed Polymerizations IV. Model Studies on Hexafluorobenzene: methoxide Phonoxide and Thirohrnoxide, Polymer Preprints, 387–388, (1981).

Traylor et al., Sterically Protected Hemins with Electronegative Substituents: Efficient Catalyst for Hydroxylation and Epoxidation, J. Chem. Soc. Commun., 279–280, (1984).

(List continued on next page.)

*Primary Examiner*—Arthur C. Prescott
*Attorney, Agent, or Firm*—Robbins, Berliner & Carson

[57] ABSTRACT

Polymers and copolymers are derived from substituted macrocyclic metal chelators. These polymers may be cross-linked, and are typically insoluble in most solvents. The metal complexes of these polymers exhibit the useful catalytic activity of the monomers. The polymers are advantageously prepared by reacting a polybasic nucleophile with the substituted macrocyclic metal chelator. Copolymers of the macrocyclic metal chelators with other polyfunctional monomers are also formed by reaction with suitable polybasic nucleophiles. Suitable macrocyclic metal chelators for use as monomers in accordance with the present invention have at least one leaving group substituent which is labile for aromatic nucleophilic substitution and at least one electronegative (or electron-withdrawing) substituent.

16 Claims, No Drawings

U.S. PATENT DOCUMENTS

| | | | |
|---|---|---|---|
| 4,800,188 | 1/1989 | Shepherd | 502/159 |
| 4,806,514 | 2/1989 | Langford et al. | 502/159 |
| 4,861,454 | 8/1989 | Ushizawa et al. | 204/414 |
| 4,888,032 | 12/1989 | Busch | 556/138 X |
| 4,892,941 | 1/1990 | Dolphin et al. | 540/145 |
| 4,904,745 | 2/1990 | Inoue et al. | 525/404 |
| 4,908,442 | 3/1990 | Narang et al. | 540/145 |
| 4,917,784 | 4/1990 | Shelnutt | 204/157.6 |
| 4,917,800 | 4/1990 | Lonsdale et al. | 210/490 |
| 4,957,615 | 9/1990 | Ushizawa et al. | 204/415 |
| 5,008,388 | 4/1991 | Ingberg et al. | 540/145 |
| 5,010,073 | 4/1991 | Kappas et al. | 514/185 |
| 5,011,907 | 4/1991 | Beratan | 528/220 |
| 5,011,956 | 4/1991 | Ford et al. | 552/304 |
| 5,114,688 | 5/1992 | Martell et al. | 556/138 X |

OTHER PUBLICATIONS

Sessler et al., Synthetic and Structural Studies of Sapphrin, a 22-$\pi$-Electron Pentapyrrolic "Expanded Porphyrin", J. Am. Chem. Soc., vol. 112, 2810–2813 (1990).

Traylor et al., Kinetics of Iron (III) Porphyrin Catalyzed Epoxidations, J. Amer. Chem. Soc., vol. 107, 5537–5539, (1985).

Traylor et al., Perhalogenated Tetraphenylhemins: Stable Catalysts of High Turnover Catalytic Hydroxylations, Inorganic Chemistry, vol. 26, 1338–1339, (1987).

Vogel et al., Tetraoxaporphycene Dictation, Angewandte Chemie, vol. 27, No. 3, 411–414, (1988).

Kojima et al., Synthesis of Polymer with Fe(III) Prophyrin Rings, J. of Poylmer Science, vol. 28, 129–132, (1990).

Gisselbrecht et al., Redox Properties of Porphycenes and Metalloporphycenes as Compared with Porphyrins, J. Am. Chem. Soc., vol. 112, 8618–8620, (1990).

Kadish et al., Synthesis and Spectroscopic Characterization of etc., J. Am. Chem. Soc., vol. 112, 8364–8368, (1990).

POLYMERS OF MACROCYCLIC METAL CHELATORS AND METHODS FOR THE PREPARATION AND USE THEREOF

This invention was made with Government support under Grant No. CHE 87-21364 awarded by the National Science Foundation. The Government has certain rights in this invention.

BACKGROUND OF THE INVENTION

The present invention relates to polymers and copolymers of macrocyclic metal chelators, such as porphyrins and phthalocyanines, to methods for the preparation thereof and to the use of metal complexes thereof as catalysts for reactions in solution or vapor phase.

The broad class of compounds known as macrocyclic metal chelators embraces many compounds which have substantial utility for a wide variety of chemical applications. For example, tetraphenyl porphyrins which are betasubstituted by halogen and/or bear electronegative substituents on the phenyl are known as catalysts in a variety of oxidative reactions. For example, iron(III) substituted porphyrins have been studied as catalysts for epoxidations using pentafluoroiodosylbenzene. (Traylor, T. G. et al., *J. Am. Chem. Soc.* 107:5537 (1985)]. The use of an iron tetrakis (2,6-dichlorophenyl)octabromoporphyrin complex as a stable catalyst of high turnover catalytic hydroxylations has also been reported [Traylor T. G. and Tsuchiya, T., *Inorg. Chem.* 26:1338 (1987)].

U.S. Pat. No. 4,892,941 to Dolphin et al., the entire disclosure of which is hereby incorporated by reference, discloses a class of transition metal porphyrin complexes which are useful in the oxidation of lignin and lignin-model compounds, the conversion of alkanes to alcohols and the conversion of alkenes to epoxides. Of particular interest to Dolphin et al. are the water soluble compounds (i.e., compounds which are substituted with water-solubilizing electronegative groups).

U.S. Pat. No. 4,917,784 to Shelnutt, the entire disclosure of which is also incorporated by reference, describes a process for the oxidation of hydrocarbons using molecular oxygen in a catalytic cycle driven by an artificial photosynthesis system which mimics the cytochrome $P_{450}$ reaction to oxidize alkanes and olefins. The system includes a tin(IV) or antimony(V) porphyrin photosynthesizer and an iron or manganese porphyrin hydrocarbon-oxidation catalyst. The preferred hydrocarbon-oxidation catalyst is Fe tetrakis(pentafluorophenyl)porphyrin chloride.

U.S. Pat. Nos. 4,774,356 and 4,904,745 to Inoue et al., the entire disclosures of which are also incorporated by reference, describe the polymerization of alkylene oxides in the presence of a reaction product of an aluminum porphyrin complex and an active hydrogen-containing compound. The aluminum porphyrin complex is suitably prepared by reacting an organoaluminum compound with a porphyrin compound. Similarly, U.S. Pat. Nos. 4,565,845 and 4,665,134 to Inoue et al. (also incorporated by reference herein) describe the use of aluminum porphyrin complexes as catalysts for producing block copolymers having a narrow molecular weight distribution.

A major disadvantage of the soluble porphyrins hereinbefore described is the necessity to separate the porphyrins from the reaction mixture. Accordingly, it would be useful to provide the catalytic activity of the known porphyrin complexes in a solid form.

U.S. Pat. No. 4,315,998 to Neckers et al. describes a method of preparing a polymer-bound photosensitizing catalyst for use in heterogeneous catalysis of photosensitized chemical reactions, which comprises forming a mixture of a polymeric material having attached thereto an available leaving group capable of being displaced in a nucleophilic displacement reaction and a photosensitizing catalytic compound containing in its molecule a nucleophile which is capable of displacing the leaving group on the polymer. Among the photosensitizers mentioned in the patent is hemin.

U.S. Pat. No. 4,724,062 to Naarmann et al. describes a process for applying a layer of an electrically conductive polymer to carbon fibers, filaments or sheet-like structures. A solution of a sulfonic acid of a phthalocyanine or porphyrin is applied to the carbon structures and dried, so that the carbon structures are coated with a layer of the sulfonic acid. The coated material is then used as the anode in a solution which contains a 5-membered heterocycle, and the monomers are anodically polymerized. The resultant products are described as exhibiting thermal stability and good electrical conductivity.

U.S. Pat. No. 4,800,188 to Shepherd describes a method for supporting metalloporphyrins on microporous polybenzimidazole articles. The polybenzimidazoles are treated with a strong base to produce an anionized material, which is then mixed with a solution of a metalloporphyrin salt to produce a microporous polybenzimidazole metalloporphyrin complex. The products are described as useful in the selective oxidation of alkanes, olefins and aromatic compounds, as well as in the separation of oxygen from a gas stream.

U.S. Pat. No. 4,806,514 to Langford et al. describes a composite photocatalyst for treatment of refractory waste, comprising particles of a wide band gap semiconductor material coated with a polymer film capable of absorbing a refractory waste. The film comprises a pyridine-containing polymer and a divalent metal porphyrin or metal phthalocyanine dye which is molecularly dispersed throughout the film and chemically bonded to the pyridine-containing polymer. In a preferred embodiment, the film comprises polyvinylpyridine or a copolymer of vinylpyridine with styrene blended with a cationic ionomer to form a cationic film which incorporates the porphyrin or phthalocyanine at cationic sites, with the polyvinylpyridine or copolymer being available for coordination.

U.S. Pat. No. 4,861,454 and 4,957,615 to Ushizawa et al. describe oxygen sensors comprising an electrically conductive substrate directly coated with an electrolytic oxidative polymeric membrane containing an aryl-substituted porphyrin compound or a metal complex thereof. The aryl-substituted porphyrin bears on the aryl groups thereof a substituent group (preferably, in the ortho- and/or parapositions) which participates at the time of electrolytic oxidative polymerization.

U.S. Pat. No. 4,908,442 to Narang et al. describes tetraketoneporphyrin monomers and methods for the preparation thereof, as well as polymers prepared by reacting the tetraketone monomers with a tetraamine-substituted aromatic moiety having at least one aromatic ring. The polymers are described to be useful as liquid crystals and in non-linear optical devices.

U.S. Pat. No. 4,917,800 to Lonsdale et al. describes thin film composite membranes comprising a microporous polymeric membrane support and an ultrathin membrane which comprises the interfacial polymerization reaction product of monomers that are mutually reactive in a condensation reaction, at least one of the monomers being a porphyrin or phthalocyanine. The resultant asymmetric membranes are described as particularly well-suited for use in artificial photosynthesis.

U.S. Pat. No. 5,011,907 to Beratan describes highly conjugated organic polymers with "defects" introduced into the polymer chain to enhance the hyperpolarizability of the molecules. The polymers comprise a chain of alternating single and double bonds or a chain of alternating single and triple bonds, and are characterized by the presence of a moiety in the chain which donates or accepts electrons. In Table 2, there is described a hypothetical molecule comprising repeating units consisting of a porphyrin/quinone donor/acceptor pair flanked by vinyl moieties. No teaching or suggestion is provided as to how such a hypothetical molecule might be prepared.

U.S. Pat. No. 5,011,956 to Ford et al. describes polymer latexes comprising colloidal suspensions of charged polymer particles containing charged metal complexes prepared from charged polymer colloids by ion exchange. The metal may be complexed by a porphyrin or phthalocyanine.

Recently, Kojima et al. described a dehydration reaction of poly(methacrylic acid) (PMAA) with hemin to prepare a hemin-PMAA anhydride. The PMAA was reported as bearing up to 1.8 mol% of porphyrin rings. The results of oxygen absorption experiments suggested that the hemin-PMAA product could act as an oxygen absorber [Kōjima, T. et al., *J. Polym. Sci. Part C: Polymer Letters* 28:129 (1990)].

Kadish et al. describe a reaction product of 5,10,15,20-tetrakis(pentafluorophenyl)porphine [(TF$_5$PP)H$_2$] and cobalt acetate in dimethylformamide, in which they speculate that fluorine in a para-position on one or more of the phenyl substituents had been replaced by a —N(CH$_3$)$_2$ group [Kadish et al., *J. Am. Chem. Soc.* 112:8364–8368 (1990)]. The authors speculate that the amine was generated in the course of decomposition of dimethylformamide used as a solvent and may have replaced a fluorine atom on one or more phenyl rings of the TF$_5$pp complex via aromatic nucleophilic substitution.

Kellman and coworkers have described phase transfer catalyzed substitutions and polymerizations of hexafluorobenzene and 4,4'-dichlorodiphenylsulfone with various phenols, bisphenols and bisthiophenols via nucleophilic replacement reactions using 18-crown-6 ether as a catalyst [Keliman et al., Polymer Preprints 21:164–165 (1980); Keliman et al., *Polymer Preprints* 22:383–384 (1981); Gerbi et al., *Polymer Preprints* 22:385–386 (1981); Gerbi et al., *Polymer Preprints* 22:387–388 (1981)]. It is reported that in the absence of 18-crown-6 ether, polymerization does not occur.

It is an object of the present invention to provide novel compositions of matter which exhibit the same utilities as the heretofore-known macrocyclic metal chelators, but which are generally insoluble in the most commonly-used solvents, and methods for the preparation and use thereof.

It is a particular object of the present invention to provide novel catalysts based upon particular types of known macrocyclic metal chelators, such as porphyrins and phthalocyanines, which are useful in the catalysis of reactions in the liquid and vapor phases, as well as methods for the preparation and use thereof.

SUMMARY OF THE INVENTION

In accordance with the present invention, there are provided polymers and copolymers of substituted macrocyclic metal chelators. These polymers may be cross-linked, and are typically insoluble in most solvents. The metal complexes of these polymers exhibit the useful catalytic activity of the monomers; for example, the iron(III) porphyrin derivatives are stable and efficient oxidation catalysts. The polymers are suitably formed by reacting a polybasic nucleophile with the substituted macrocyclic metal chelator. When using a dibasic nucleophile, for example, the polymerization is preferably carried out with a ratio of two moles of dibasic nucleophile to one mole of macrocyclic metal chelator. Copolymers of the macrocyclic metal chelators with other polyfunctional monomers are also formed by reaction with suitable polybasic nucleophiles. Suitable macrocyclic metal chelators for use as monomers in accordance with the present invention have at least one leaving group substituent which is labile for aromatic nucleophilic substitution and at least one electronegative (or electron-withdrawing) substituent.

DETAILED DESCRIPTION OF THE INVENTION

In accordance with the present invention, the novel polymers are prepared by aromatic nucleophilic substitution reaction of substituted macrocyclic metal chelators with polybasic nucleophiles. A wide variety of different macrocyclic metal chelators are known or may readily be prepared using conventional organic synthetic methods. For purposes of the present invention, a macrocyclic metal chelator is defined as a heterocyclic ring structure which is capable of forming a complex with (i.e., chelates) a metal ion. Exemplary structures of this type include, but are not limited to, the following: porphyrins, benzporphyrins, phthalocyanines, porphycenes, oxaporphycenes, cryptands, sappharins and crown ethers. Moreover, while the present discussion focuses in detail upon individual macrocyclic metal chelators, it would be readily apparent to those of skill in the art that various multimeric structures (e.g., diporphyrins) would be equally suitable for use in accordance with the present invention.

Any macrocyclic metal chelator having at least one position subject to aromatic nucleophilic substitution would be suitable for use as a monomer pursuant to the present invention. In the most general terms, therefore, all macrocyclic metal chelators which bear at least one leaving group labile to aromatic nucleophilic substitution are available for use as monomers in accordance with the present invention. In order to introduce significant cross-linking in the product polymer, it is preferred that the macrocyclic metal chelators bear at least two leaving groups. In addition, as is well known in the field of organic chemistry, it is advantageous that the macrocyclic metal chelators also bear at least one electronegative (or electron-withdrawing) substituent; by virtue of the presence of at least one electronegative substituent in an appropriate position on the macrocyclic metal chelator structure, any leaving group(s) would be rendered more labile. The electronegative substituent(s) would be chosen and situated so as to render the leaving group(s) labile to nucleophilic substitution, in a manner well known per se. There is a vast body of information which has been accumulated concerning aromatic nucleophilic substitution, which is perhaps one of the most intensively studied areas in the whole of organic chemistry; while the suitability of any particular macrocyclic metal chelator for a nucleophilic substitution may of course be readily determined empirically, the scientific literature also provides a wealth of useful information concerning this reaction mechanism [see, e.g., Miller, J., *Aromatic Nucleophilic Substitution*, Elsevier Publishing Company: Amsterdam, London, New York (1968), the entire disclosure of which is hereby incorporated by reference].

Suitable leaving groups are, in the most general terms, the anions of any strong acid. These include, but are not limited to, the following: halogen, tosylate, brosylate, and sulfonate. Suitable electronegative substituents include, but are not limited to, the following: halogen, nitro, cyano, trifluoromethyl, etc. As is readily apparent, the same type of substituent may function (depending upon its position in the structure and the substitution pattern of the molecule as a whole) as either a leaving group or an electronegative group. By examination of the structure of a given macrocyclic metal chelator, one skilled in the art may generally determine which substituents are most labile through the application of fundamental principles of resonance structure analysis and electronegativity. Of course, the substituent(s) most prone to aromatic nucleophilic substitution in a given structure may also be identified empirically in a manner known per se (for example, by carrying out a nucleophilic substitution reaction with a particular nucleophile and determining the location of that nucleophile in the resultant product through, e.g., spectroscopy). It will of course be readily apparent to those skilled in the art that the presence of an appropriately-substituted aromatic group at any location in the macrocyclic metal chelator molecule would itself be sufficient to enable the desired aromatic nucleophilic substitution reaction to take place. Therefore, while in the following discussion of particular embodiments emphasis is placed for purposes of convenience upon systems in which the leaving group is located on the principal macrocycle or on an aryl substituent pendant thereto, it is by no means essential to the present invention that this be the case. Rather, the salient feature of the present invention is the ability to form polymers comprising macrocyclic metal chelators by nucleophilic substitution reactions, as long as the macrocyclic metal chelator monomer bears at least one leaving group labile to aromatic nucleophilic substitution somewhere in its structure.

The remaining positions on the macrocyclic metal chelator (i.e., positions which do not bear leaving and/or electronegative groups) bear non-interfering substituents. By "non-interfering substituents" is meant a group which in a given position on a macrocyclic metal chelator of a given substitution pattern does not interfere with the course of the polymerization reaction. Depending upon the position and substitution pattern of the macrocyclic metal chelator, for example, a halogen may behave as a leaving group, an electronegative group or as a non-interfering substituent. Suitable substituents which generally behave as non-interfering substituents include, but are not limited to, the following: hydrogen; alkyl which is unsubstituted or substituted with one or more other non-interfering substituents and which may be straight-chained or branched (and including cycloalkyl); aryl or heteroaryl which is unsubstituted or substituted with one or more other non-interfering substituents; cyano; nitro; amino (primary, secondary and tertiary); alkoxy and aryloxy; carboxyl, alkylcarboxy and alkoxycarbonyl; etc.

Of particular interest for use as monomers in accordance with the present invention are a number of specific classes of macrocyclic metal chelators which have been extensively exploited for a variety of purposes in monomeric form, either in the free form or in the form of the corresponding metal complexes. Several of these classes are discussed in detail below; it should be understood, however, that this description of suitable classes of macrocyclic metal chelators is intended for purposes of illustration only, and is by no means intended to be exhaustive.

Suitable substituted porphyrins have the Formula I

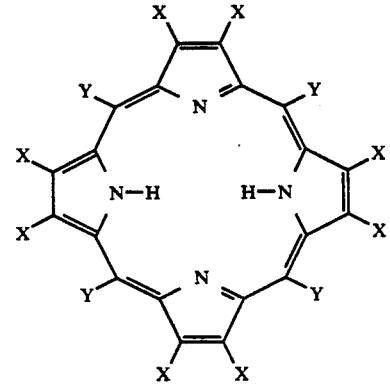

wherein each X is independently selected from the group consisting of leaving groups labile to aromatic nucleophilic substitution, electronegative substituents, non-interfering substituents and R;

each Y is independently selected from the group consisting of leaving groups labile to aromatic nucleophilic substitution, electronegative substituents, non-interfering substituents and R; and R is aryl which is fully substituted by Z groups, in which each Z is independently selected from the group consisting of leaving groups amenable to aromatic nucleophilic substitution, electronegative substituents and non-interfering substituents, with the proviso that at least one X, Y or Z substituent is a leaving group and at least one other X, Y or Z substituent is an electronegative group. A preferred aryl for R is phenyl (which has 5 Z groups):

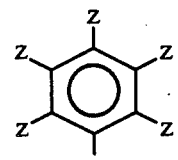

Other aryl groups which may be used as R in place of phenyl include naphthyl (which has 7 Z groups), and phenanthryl and anthracyl (which have 9 Z groups).

In a preferred class of porphyrins of Formula 1, at least two X, Y or Z substituents are leaving groups amenable to aromatic nucleophilic substitution. With monomers of this preferred class, a substantial degree of cross-linking is possible, because each monomer has at least two sites for nucleophilic substitution.

A preferred class of porphyrins has the Formula II

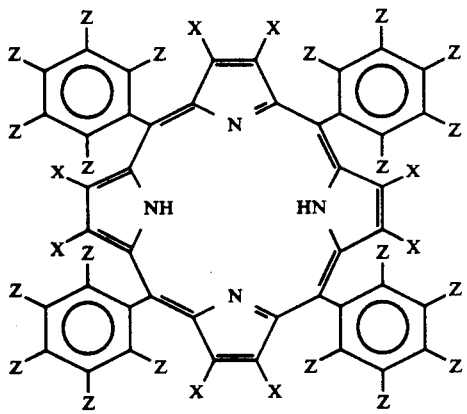

wherein X and Z are as previously defined, with the proviso that at least one Z substituent is a leaving group and at least one other Z substituent is an electronegative group. A particularly preferred class of porphyrins of the Formula II are those in which each X is independently selected from the group consisting of hydrogen and halogen; at least one Z substituent is a leaving group selected from the group consisting of halogen, tosylate, brosylate, and sulfonate; and at least one other Z substituent is an electronegative group selected from the group consisting of halogen, nitro, cyano and trifluoromethyl. Compounds of Formula 11 in which all the Z substituents are halogen are highly activated for aromatic nucleophilic substitution and are especially preferred; compounds in which all of the X and Z substituents are halogen are even more highly activated.

In addition to the tetraaryiporphyrin substitution pattern of Formula II, the octaarylporphyrin substitution pattern (i.e., the compounds of Formula I in which all Y substituents are R or other aryl) is also known [see, e.g., Takeda et al., Chem. Pharm. Bull. 38:266–266 (1990), the entire disclosure of which is hereby incorporated by reference]. Thus, it is possible by appropriate manipulation of the starting materials to provide porphyrins with up to twelve aryl substituents (i.e., all X and Y are R or other aryl).

Suitable substituted phthalocyanines and benzporphyrins have the Formula III

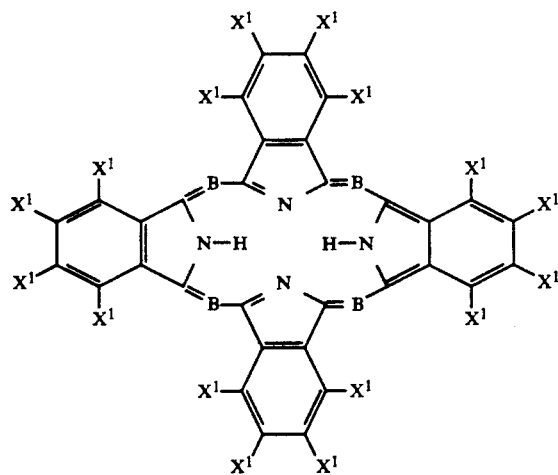

in which each $X^1$ is independently selected from the group consisting of leaving groups labile to aromatic nucleophilic substitution, electronegative substituents, non-interfering substituents and $R^1$;

B is=N- or =$CY^1$-, in which each $Y^1$ is independently selected from the group consisting of electronegative substituents and non-interfering substituents; and $R^1$ is aryl which is fully substituted by $Z^1$, in which each $Z^1$ is independently selected from the group consisting of leaving groups amenable to aromatic nucleophilic substitution, electronegative substituents and non-interfering substituents, with the proviso that at least one $X^1$ or $Z^1$ substituent is a leaving group and at least one other $X^1$ or $Z^1$ substituent is an electronegative group. Once again, preferred phthalocyanines (B is =N—) and benzporphyrins (B is =$CY^1$—) are those in which at least two $X^1$ or $Z^1$ substituents are leaving groups; particularly preferred phthalocyanines and benzporphyrins are those in which a substantial number of the $X^1$ and/or $Z^1$ substituents are leaving and/or electronegative groups (e.g., halogen).

A number of other classes of macrocyclic metal chelators with aromatic ring structures resembling those of porphyrins and phthalocyanines are also known. Examples include compounds of Formula IV

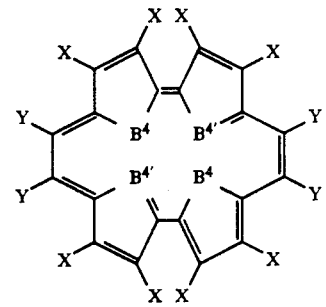

in which X and Y are as previously defined, $B^4$ is N-H and $B^{4'}$ is N (porphycene) or $B^4$ is O and $B^{4'}$ is O+(tetraoxaporphycene) [see, e.g., Vogel et al., Angew. Chem. Int Ed. Engl. 27:411–414 (1988) and Gisselbrecht et al., J. Am. Chem. Soc. 112:8618–8620 (1990), the entire disclosures of which are hereby incorporated by reference]. Another class of macrocyclic metal chelator has a structure of the Formula V

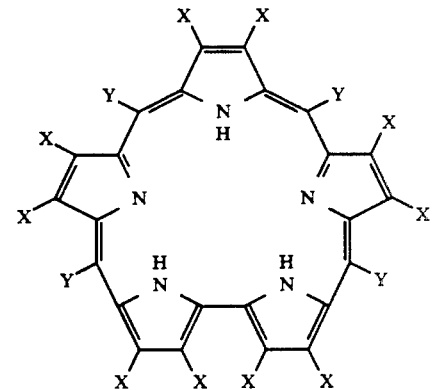

in which X and Y are as previously defined for Formula I [see, e.g., Sessler et al., J. Am. Chem. Soc. 112:2810–2813 (1990), the entire disclosure of which is hereby incorporated by reference]. This class of compounds, an early example of which was synthesized by R. B. Woodward, have recently been suggested as having utility as synthesizers for the in vitro photoeradication of both herpes simplex virus (HSV-1) and cell-free human immunodeficiency virus (HIV-1) [see Sessler et al., supra, fn. 7 and 8]. Yet another class of compounds suitable for use as monomers in accordance with the present invention has the Formula VI

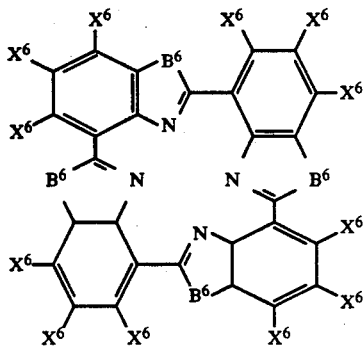

in which each $B^6$ is independently selected from the group consisting of —S—, —O— and —$NY^6$—; and $X^6$ and $Y^6$ are defined in the same manner as $X^1$ and $Y^6$ respectively, in Formula II. This class of compounds is described in, e.g., U.S. Pat. No. 3,481,945 to Nichols et al., the entire disclosure of which is hereby incorporated by reference. Other aromatic macrocyclic metal chelators of comparable structures are also contemplated as within the scope of the present invention, with of course the proviso that there be at least one (and preferably, two or more) leavings groups labile to aromatic nucleophilic substitution present somewhere in the molecule.

In addition to the classes of macrocyclic metal chelators previously discussed, which may generally be characterized as extended heteroaromatic ring systems, there is another important class of macrocyclic metal chelators which are clearly contemplated as within the scope of the present invention. This second broad group of macrocyclic metal chelators, exemplified by such known classes of compounds as crown ethers and cryptands, are non-aromatic heterocyclic systems which nonetheless function effectively as chelators. As the macrocyclic metal chelators of this second group are not aromatic rings systems themselves, in order to employ these compounds as monomers in accordance with the present invention it is necessary to introduce one or more aromatic ring structures into the parent molecular structure. By way of illustration, 15-crown-5 and 18-crown-6 ethers of the following formulas

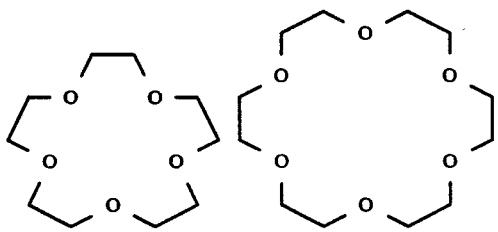

serve as the prototypes for monomers useful in accordance with the present invention of Formulas VII and VIII (derived from 15-crown-5) and Formulas IX and X (derived from 18-crown-6):

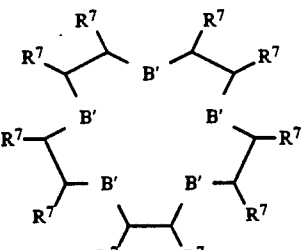

VII

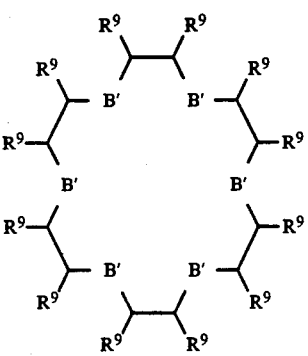

IX

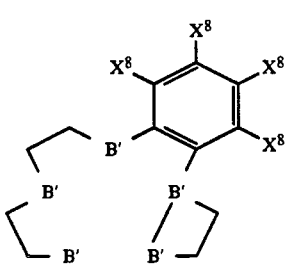

VIII

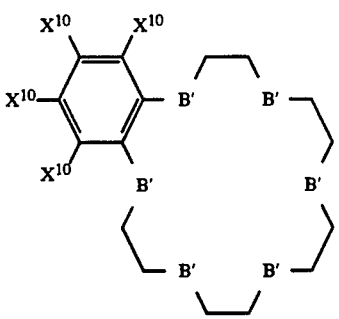

X in which each B' is independently selected from the group consisting of —S—, —O— and —$NY^{10}$—, in which each $Y^{10}$ is independently selected from the group consisting of non-interfering substituents; and at least one $R^7$ Substituent (in Formula VII) or at least one $R^9$ substituent (in Formula IX) is R (as previously defined for Formula I), or at least one $X^8$ substituent (In Formula VIII) or at least one $X^{10}$ substituent (in Formula X) is a leaving group labile to aromatic nucleophilic substitution and at least one other $X^7$ or $X^9$ substituent is an electronegative group (in Formulas VII and IX, respectively). Once again, those skilled in the art could readily derive suitable hybrid structures from the basic principles of attaching a suitable aromatic substituent onto the ring (as in Formulas VII and IX) and incorporating an aromatic ring system into the macrocyclic framework (as in Formulas VIII and X). It must again be stressed that the salient feature of macrocyclic metal chelator monomers suitable for use in accordance with the present invention is the presence of at least one leaving group on the molecule which is labile to aromatic nucleophilic substitution. Therefore, it should again be apparent that without departing from the intended scope of the present invention, the situs for aromatic nucleophilic substitution (i.e., a labile leaving group on an aryl group) may be part of the monomer structure by attachment via a substituent (e.g., an alkyl group) on the principal macrocyclic metal chelator ring, rather than being located directly on the ring itself or on an aryl group attached directly to the ring itself.

Suitable metals for use in forming metal complexes with the monomeric macrocyclic metal chelators are those which form complexes with the macrocyclic metal chelators. For many uses, the metals are preferably selected from the transition metals, the lanthanide series and the actinide series. The metal ion will generally have an oxidation state of $+1$ or higher; for many applications, an oxidation state of $+3$ or higher is preferred. Particularly suitable metals include, but are not limited to, the following: aluminum, zinc, tin, titanium, vanadium, chromium, manganese, iron, cobalt, nickel, copper, ruthenium, rhodium, palladium, osmium, iridium, platinum, silver and gold.

In addition, the metal ion may bear one or more ligands above and/or below the plane of the macrocyclic metal chelator, for example as described for porphyrins and phthalocyanines in U.S. Pat. No. 4,568,435 to Shelnutt, the entire disclosure of which is hereby incorporated by reference. Moreover, so-called "it sandwich" systems involving out-of-plane complexes between the pi-electron systems of two or more molecules are also contemplated for use in accordance with the present invention.

The polymers of the invention are formed by reacting a monomer mixture comprising at least one macrocyclic metal chelator with a suitable polybasic nucleophile, such that any leaving group on the macrocyclic metal chelator is replaced by the nucleophile to form a bridging group. Any polydentate nucleophile which carries out nucleophilic substitution (in particular, aromatic nucleophilic substitution) will accomplish this polymerization. Suitable nucleophiles include both dianions (i.e., single atoms on a molecule with oxidation states of $-2$) and two or more nucleophilic anions or neutral nucleophiles attached to the same molecule. Exemplary nucleophiles include alkoxides, mercaptides, amines and amides. Reagents such as sodium hydroxide, sodium sulfide and sodamide are difunctional by virtue of the fact that upon nucleophilic substitution on, e.g., a phenyl group, the product (phenol, thiophenol or aniline, respectively) is electronegatively substituted; this product is instantly converted into its anion which, by further reaction, brings about polymerization. Particular nucleophiles useful in accordance with the present invention include the following: NaS(R')SNa, NR"HR'NR"H, NaSAr'SNa, NaOR'ONa, Na$_2$S, Na$_2$Se, NaNH$_2$, and Na$_2$C$_2$, in which R' is alkylene, Ar' is arylene and R" is hydrogen, alkyl or aryl. Exemplary nucleophiles include disodium ethanedithiolate, disodium ethylene glycolate, ethylene diamine and sodium oxide.

The reaction of macrocyclic metal chelator with polyfunctional nucleophile may be carried out over a broad range of temperatures and pressures, and in a variety of suitable solvents. The reaction is conveniently carried out at atmospheric or slightly elevated pressure; it is advantageous, but not necessary in all cases, to carry out the reaction under an inert atmosphere (e.g., nitrogen or argon). Suitable reaction times and temperatures may readily be determined empirically for a given set of macrocyclic metal chelators and polyfunctional nucleophiles; by way of example, polymerization of substituted porphyrins is conveniently carried out at temperatures over the range of about 150°-180° C. for about four hours.

In addition to homopolymers comprising a single macrocyclic metal chelator as monomer, copolymers of two or more macrocyclic metal chelators and copolymers of at least one macrocyclic metal chelator with at least one other polyfunctional monomer are also contemplated. The polyfunctional monomers have the Formula XI

wherein the —R$^{11}$X$^{11}$ substituents are the same or different and in which n is an integer $\geq 2$;

A is a direct bond (when n=2), a bridging atom or a bridging group;

R$^{11}$ is an unsubstituted or substituted alkylene or arylene moiety; and

X$^{11}$ is a leaving group amenable to nucleophilic substitution.

Suitable bridging atoms and groups would be well known to those of skill in the art. For example, A may be a carbon-carbon bond, O or S when n=2; P or N when n=3; and C or Si when n=4. Moreover, with bridging atoms such as P, N, C and Si, it is not necessary that all valence positions be occupied by —R$^{11}$X$^{11}$ substituents; thus, by way of example in the case of C, two or three of the four available valence positions may be occupied by —R$^{11}$X$^{11}$, and the remainder (two or one, respectively) by other, non-reacting substituents. Similarly, A may be derived by way of example from a straight-chain or branched hydrocarbon, a cyclohydrocarbon, an aromatic hydrocarbon, or a heteroaromatic hydrocarbon. It is further contemplated in accordance with the present invention that the —R$^{11}$X$^{11}$ groups may be different. The salient feature of the compounds of Formula XI is that they provide at least two functionalities which may be displaced by the polyfunctional nucleophile used for forming the cross-linked polymers of the invention. While the monomers of Formula XI may increase cross-linking when n>2, it is not necessary that they do so; depending upon substitution pattern, the macrocyclic metal chelators may themselves provide for substantial cross-linking of the product polymers. Moreover, in many instances, an essentially completely linear polymer comprising macrocyclic metal chelator monomers is itself substantially insoluble in most common solvents, and therefore contemplated as well within the scope of the present invention.

Preferably, R$^{11}$ is highly activated by substitution with one or more electron-withdrawing groups. Thus, preferred R$^{11}$ groups may be derived from perhalohydrocarbons, perhaloarenes and perhaloheteroarenes, as well as similar compounds bearing one or more other electronegative substituents (e.g., cyano, nitro, etc.). Exemplary polyfunctional monomers include perhalobiphenyls, perhalodiphenyl sulfides, perhalotriphenyl phosphines and certain polynitrodihaloaromatic compounds (e.g., 3,3'-dichloro-4,4'-dinitrobiphenyl).

The resultant polymers are essentially completely insoluble in all common solvents, such as water, dimethylformamide, methylene chloride, alcohols and hydrocarbons. It is believed that this is due to the high degree of cross-linking anticipated upon reaction of the macrocyclic metal chelators with the polyfunctional nucleophile. Moreover, the highly substituted (in particular, halogenated) polymers are resistant to thermal or oxidative destruction.

The polymers of the invention, in the form of the metal complexes, are useful for the same purposes as the corresponding macrocyclic metal chelator monomer/metal complexes, but provide the additional advantage of being in solid form (as opposed to the macrocyclic metal chelators themselves, which are almost invariably liquids at room temperature). Thus, by way of illustration, the inventive polymers derived from porphyrins and phthalocyanines are useful as solid catalysts in reactions in the liquid or vapor phase. Depending upon the nature of the macrocyclic metal chelator monomer(s) and choice of metal, the polymers of the invention may be used as catalysts for a variety of different types of reactions. For example, the iron(III) porphyrin and phthalocyanine complexes are unusually stable catalysts for oxidation reactions; in conjunction with a suitable oxidant, these iron(III) complexes may be employed for solution or solid-phase conversions of alkanes to the corresponding alcohols (with production of minor amounts of aldehyde or ketone), for conversion of secondary alcohols to the corresponding ketones, or for epoxidation of alkenes. The iron-based catalysts are also useful in the oxidation of amines, sulfides and other organic compounds. In addition, as would be readily apparent to those of skill in the art, complexes comprising metals other than iron may be employed for the same purposes as the corresponding porphyrin or phthalocyanine monomers. Similar considerations would apply to polymers derived from other macrocyclic metal chelators; the chemistry of the parent monomers is generally preserved and in many instances improved, and the use of the solid polymers (in place of the liquid monomers) results in increased convenience and efficacy in virtually every instance.

The exemplary porphyrin- and phthalocyanine-based catalysts of the invention are highly effective, providing very high yields based upon oxidant over a range of conversion percentages. For example, up to 70% of alcohol (e.g., cyclohexanol) containing only small amounts of ketone (e.g., <3% cyclohexanone) have been obtained based upon oxidant at 10% conversion; at higher conversions, the percentage of ketone recovered tends to increase. Quantitative or nearly quantitative yields of epoxidation based upon alkene are also obtained in many cases. Moreover, the catalysts allow at least $10^3$ turnovers of hydroxylation and $10^5$ of epoxidation without significant catalyst loss.

Suitable oxidants for use in combination with the exemplary porphyrin- and phthalocyanine-based iron catalysts include hydrogen peroxide, ozone, peracids and iodosylbenzenes; rates increase in that order and range from about 1 turnover/minute upwards. The solid phase catalysts may be stirred with oxidant and substrate, the product removed and the catalyst reused several times. Alternatively, the solution of oxidant and substrate may be passed continuously through a bed of the solid catalyst. The solvent is chosen to dissolve the substrate and the oxidant; methylene chloride, as well as mixtures thereof with alcohols (e.g., $CF_3CH_2OH$, $CH_3OH$, etc.) and/or water, is particularly suitable for this purpose. Similarly, these catalysts may be employed in conventional vapor-phase reaction systems.

The invention will be better understood by reference to the following examples which are intended for purposes of illustration and are not to be construed as in any way limiting the scope of the present invention, which is defined in the claims appended hereto.

EXAMPLES

Example 1

Preparation of Homopolymer of iron(III) tetrakis-(pentafluorolphenyl)porphyrin chloride Under an argon atmosphere, 40 mg ($3.76 \times 10^{-5}$ M) of iron(III) tetrakis(pentafluorophenyl)porphyrin chloride was stirred with 18 mg ($7.52 \times 10^{-5}$ M) of sodium sulfide hydrate in 1 ml dimethylformamide for four hours at 160° C. A black solid precipitated; no color remained in the solution. Cooling, filtration, washing successively with dimethylformamide, acetone, methanol and methylene chloride and drying afforded 38 mg of a hard black solid which was insoluble in all solvents tried.

EXAMPLE 2

Preparation of Homopolymer of iron(III) tetrakis-(pentafluorophenyl)porphyrin

Following the procedure of Example 1, 0.1 millimole of iron(III) tetrakis(pentachloro-phenyl)porphyrin was reacted with 0.2 millimoles of sodium sulfide in sulfolane (tetramethylene sulfone) at 180° C. for four hours. The dark precipitate was isolated as in Example 1. The yield was nearly quantitative.

EXAMPLE 3

Preparation of Homopolymer of iron(III) tetrakis(pentafluorophenyl)octachloroporphyrin Following the procedure of Example 1, a homopolymer was prepared by reacting one molar equivalent of iron(III) tetrakis(pentafluorophenyl)octachloroporphyrin with 2 molar equivalents of sodium sulfide hydrate in dimethylformamide at 160° under argon for four hours. The precipitated black solid was recovered as in Example 1.

EXAMPLE 4

Preparation of Copolymers

Following the procedure of Example 1, aliquots of 0.1 millimole of iron(III)tetrakis(pentafluorophenyl)porphyrin was reacted in dimethylformamide at 150° C. for four hours with 2 millimoles of sodium sulfide and each of the following: one millimole perfluoro-biphenyl; one millimole perfluorotriphenylphosphine; and one millimole perfluorodiphenylsulfide. In each case, the dark precipitates were filtered off, washed with dimethylformamide and dichloromethane, and dried. The weight of products indicated incorporation of at least 95% of the respective two reactants. In all cases, the catalytic properties of the products resembled those of the homopolymers, but the polymeric products were somewhat less brittle.

EXAMPLE 5

Use of Homopolymers and Copolymers as Catalysts in Oxidation of Cyclohexane

A solution of 1M cyclohexane (54 μl) and 0.06M pentafluoroiodosylbenzene (PFIB; 9.4 mg) in 0.5 ml dichloromethane, trifluoroethanol and water (80:18:2 by volume) containing 4 mg of the solid polymer prepared according to Example 1 was stirred for three-five minutes. The supernatant liquid was then analyzed by gas liquid chromatography. Based upon the peak area for pentafluoroiodobenzene and the relative sensitivity factors, the yield was 70% cyclohexanol and about 1% cyclohexanone. Longer reaction times afforded the same yield.

The recovered catalyst was used five times in identical experiments without reduction in yield. After seven uses, the polymer became lighter in color and broke more easily. Similar yields were also obtained when the solvent used was dichloromethane containing 1% hexafluoroacetone trihydrate.

The procedure was repeated with the homopolymer of iron(III) tetrakis(pentafluorophenyl)-octachloroporphyrin [$F_{20}Cl_8$TPP-S] and the copolymers of $F_{20}$TPP iron(III)Cl with perfluorobiphenyl [PFB], perfluorodiphenyl sulfide [PFDPS] and perfluorotriphenylphosphine [PFTPP]. The results of the oxidations are reported in Table I.

TABLE I

Yield of Cyclohexanol in Polymer Catalyzed Reactions

| Fe(III) Porphyrin Polymer | % Yield cyclohexanol + cyclohexanone | alcohol/ ketone |
|---|---|---|
| $F_{20}$TPP-S | 70 | 45 |
| $F_{20}$TPP-S/PFB | 78 | 52 |
| $F_{20}$TPP-S/PFDPS | 65 | 55 |
| $F_{20}$TPP-S/PFTPP | 60 | 45 |
| $F_{20}Cl_8$TPP-S | 33 | 90 |

EXAMPLE 7

Use of the Homopolymer of iron(III) tetrakis(penta-fluorolphenyl) porphyrin as Catalyst in Oxidation of Norbornene Following the procedure of Example 5, norbornene was used as the substrate. A quantitative yield of oxidized products was obtained. The ratio of exo/endo epoxide was 12/1.

EXAMPLE 8

Use of the Copolymer of iron(III) tetrakis(penta-fluorolphenyl) porphyrin and Perfluorobiphenyl as Catalyst in a Continuous-Flow Reactor The feasibility of using a continuous flow reactor was examined by making a small column (5 mm diameter by 3 cm length) of the copolymer and passing the PFIB plus cyclohexane solution through the column at a rate of about 0.3 mi/min. The eluent was analyzed by gas liquid chromatography. Cyclohexanol containing about 1% cyclohexanone was obtained in 50% yield (based on PFIB).

From the foregoing description, one skilled in the art can readily ascertain the essential characteristics of the invention and, without departing from the spirit and scope thereof, can adapt the invention to various usages and conditions. Changes in form and substitution of equivalents are contemplated as circumstances may suggest or render expedient, and although specific terms have been employed herein, they are intended in a descriptive sense and not for purposes of limitation.

What is claimed is:

1. A polymer comprising at least one macrocyclic metal chelator as a repeating monomeric unit, said macrocyclic metal chelator monomeric unit being derived from a monomer containing at least one leaving group substituent which is labile for aromatic nucleophilic substitution and at least one electronegative substituent.

2. A polymer according to claim 1, wherein said polymer comprises the reaction product of said monomer and a polybasic nucleophile, such whereby the at least one leaving group on the monomer is replaced by the nucleophile to form a bridging group.

3. A polymer according to claim 1, further comprising at least one metal complexed with said macrocyclic metal chelator.

4. A polymer according to claim 1, wherein said at least one macrocyclic metal chelator is selected from the group consisting of porphyrins, benzporphyrins, phthalocyanines, porphycenes, oxaporphycenes, cryptands, sappharins and crown ethers.

5. A polymer according to claim 1, wherein said monomer has the Formula I

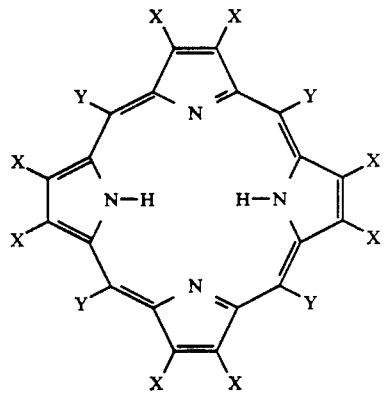

wherein each X is independently selected from the group consisting of leaving groups labile to aromatic nucleophilic substitution, electronegative substituents, non-interfering substituents and R;

each Y is independently selected from the group consisting of leaving groups labile to aromatic nucleophilic substitution, electronegative substituents, non-interfering substituents and R; and R is aryl which is fully substituted by Z groups, in which each Z is independently selected from the group consisting of leaving groups amenable to aromatic nucleophilic substitution, electronegative substituents and non-interfering substituents, with the proviso that at least one X, Y or Z substituent is a leaving group and at least one other X, Y or Z substituent is an electronegative group.

6. A polymer according to claim 1, wherein the monomer has the Formula III

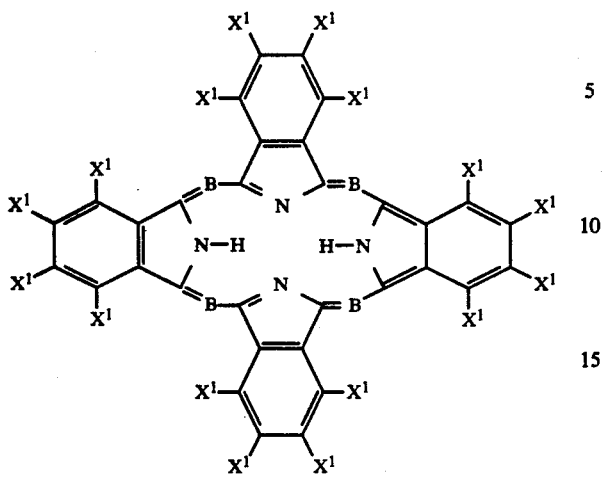

in which each $X^1$ is independently selected from the group consisting of leaving groups labile to aromatic nucleophilic substitution, electronegative substituents, non-interfering substituents and $R^1$;

B is =N— or =$CY^1$—, in which each $Y^1$ is independently selected from the group consisting of electronegative substituents and non-interfering substituents; and $R^1$ is aryl which is fully substituted by $Z^1$, in which each $Z^1$ is independently selected from the group consisting of leaving groups amenable to aromatic nucleophilic substitution, electronegative substituents and non-interfering substituents, with the proviso that at least one $X^1$ or $Z^1$ substituent is a leaving group and at least one other $X^1$ or $Z^1$ substituent is an electronegative group.

7. A polymer according to claim 1, wherein the monomer has the Formula IV

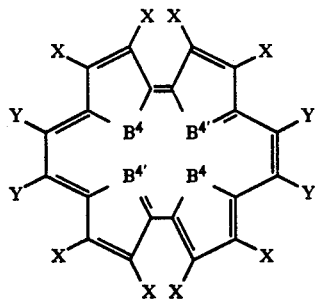

wherein each X is independently selected from the group consisting of leaving groups labile to aromatic nucleophilic substitution, electronegative substituents, non-interfering substituents and R;

each Y is independently selected from the group consisting of leaving groups labile to aromatic nucleophilic substitution, electronegative substituents, non-interfering substituents and R; and R is aryl which is fully substituted by Z groups, in which each Z is independently selected from the group consisting of leaving groups amenable to aromatic nucleophilic substitution, electronegative substituents and non-interfering substituents, with the proviso that at least one X, Y or Z substituent is a leaving group and at least one other X, Y or Z substituent is an electronegative group; and $B^4$ is N-H and $B^{4'}$ is N or $B^4$ is O and $B^{4'}$ is $O^+$.

8. A polymer according to claim 1, wherein the monomer has the Formula V

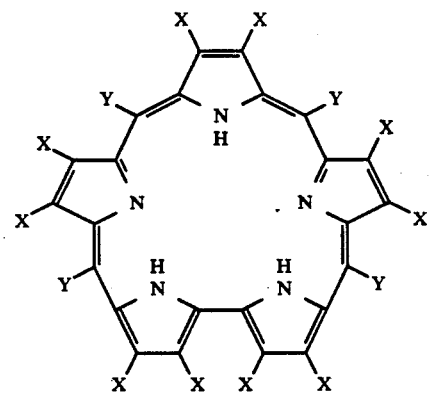

wherein each X is independently selected from the group consisting of leaving groups labile to aromatic nucleophilic substitution, electronegative substituents, non-interfering substituents and R;

each Y is independently selected from the group consisting of leaving groups labile to aromatic nucleophilic substitution, electronegative substituents, non-interfering substituents and R; and R is aryl which is fully substituted by Z groups, in which each Z is independently selected from the group consisting of leaving groups amenable to aromatic nucleophilic substitution, electronegative substituents and non-interfering substituents, with the proviso that at least one X, Y or Z substituent is a leaving group and at least one other X, Y or Z substituent is an electronegative group.

9. A polymer according to claim 1, wherein the monomer has the Formula VI

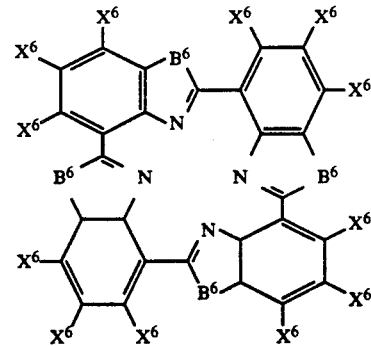

in which each B independently selected from the group consisting of —S—, —O— and —$NY^6$; and each $X^6$ is independently selected from the group consisting of leaving groups labile to aromatic nucleophilic substitution, electronegative substituents, non-interfering substituents and $R^6$;

each $Y^6$ is independently selected from the group consisting of electronegative substituents and non-interfering substituents; and $R^6$ is aryl which is fully substituted by $Z^6$, in which each $Z^6$ is independently selected from the group consisting of leaving groups amenable to aromatic nucleophilic substitution, electronegative substituents and non-interfering substituents, with the proviso that at least one $X^6$ or $Z^6$ substituent is a leaving group and at least one other $X^6$ or $Z^6$ substituent is an electronegative group.

10. A polymer according to claim 1, further comprising at least one additional repeating monomeric unit derived from a compound of Formula IX $$(A)-(R^{11}X^{11})_n,$$

wherein the $-R^{11}X^{11}$ substituents are the same or different and in which n is an integer $>2$;

A is a direct bond (when n=2), a bridging atom or a bridging group;

$R^{11}$ is an unsubstituted or substituted alkylene or arylene moiety; and $X^{11}$ is a leaving group amenable to nucleophilic substitution.

11. A polymer according to claim 1, wherein the monomer is selected from the group consisting of crown ethers and derivatives of crown ethers in which at least one O is replaced by one of $-S-$, $-NY^{10}$ and mixtures thereof, in which each $Y^{10}$ is independently selected from the group consisting of non-interfering substituents.

12. A polymer comprising the reaction product of at least one polybasic nucleophile and at least one macrocyclic metal chelator monomer containing at least one leaving group substituent which is labile for aromatic nucleophilic substitution and at least one electronegative substituent.

13. A polymer according to claim 12, wherein the polymer is the reaction product of said at least one nucleophile, said at least one macrocyclic metal chelator and a further monomer of Formula XI $$(A)-(R^{11}X^{11})_n,$$

wherein the $-R^{11}X^{11}$ substituents are the same or different and in which n is an integer $\geq 2$;

A is a direct bond (when n=2), a bridging atom or a bridging group;

$R^{11}$ is an unsubstituted or substituted alkylene or arylene moiety; and $X^{11}$ is a leaving group amenable to nucleophilic substitution.

14. A method of preparing a polymer comprising at least one macrocyclic metal chelator as a repeating monomeric unit, said method comprising:

reacting at least one polybasic nucleophile with at least one macrocyclic metal chelator monomer containing at least one leaving group substituent which is labile for aromatic nucleophilic substitution and at least one electronegative substituent; and recovering the resultant reaction product.

15. A method according to claim 14 wherein said at least one polybasic nucleophile and said at least one macrocyclic metal chelator monomer are reacted with a further co-monomer of Formula XI $$(A)-(R^{11}X^{11})_n,$$

wherein the $-R^{11}X^{11}$ substituents are the same or different and in which n is an integer $\geq 2$;

A is a direct bond (when n=2), a bridging atom or a bridging group;

$R^{11}$ is an unsubstituted or substituted alkylene or arylene moiety; and $X^{11}$ is a leaving group amenable to nucleophilic substitution.

16. A method according to claim 14, wherein said polybasic nucleophile is selected from the group consisting of dianions, alkoxides, mercaptides, amines and amides.

* * * * *

UNITED STATES PATENT AND TRADEMARK OFFICE
CERTIFICATE OF CORRECTION

PATENT NO. : 5,286,887
DATED : February 15, 1994
INVENTOR(S) : Teddy G. Traylor et al It is certified that error appears in the above-indentified patent and that said Letters Patent is hereby corrected as shown below:

Column 7, line 30 "Formula 11" should be --Formula II--
Column 11, line 33, delete "it"
Column 12, line 23, "$\geqq$" should be --$\geq$--
Column 18, line 55, "B" should be --$B^6$--
Column 19, line 11, ">" should be --$\geq$--
Column 20, line 2, "$\geqq$" should be --$\geq$--
Column 20, line 26, "$\geqq$" should be --$\geq$--

Signed and Sealed this

Twenty-seventh Day of September, 1994

Attest:

BRUCE LEHMAN

*Attesting Officer*  *Commissioner of Patents and Trademarks*